United States Patent
Kim et al.

(10) Patent No.: US 8,213,599 B2
(45) Date of Patent: Jul. 3, 2012

(54) SPRING, SEMI-AUTOMATIC SLIDING DEVICE USING THE SAME AND SLIDING-TYPE PORTABLE COMMUNICATION TERMINAL

(75) Inventors: Ho-Su Kim, Gumi-si (KR); Jae-Gab Lee, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1327 days.

(21) Appl. No.: 11/828,576

(22) Filed: Jul. 26, 2007

(65) Prior Publication Data

US 2008/0099969 A1    May 1, 2008

(30) Foreign Application Priority Data

Oct. 31, 2006    (KR) .................. 10-2006-0106387

(51) Int. Cl.
*H04M 1/00*    (2006.01)
*H04M 9/00*    (2006.01)
(52) U.S. Cl. ................. 379/433.12; 379/433.11
(58) Field of Classification Search ............ 379/433.11, 379/433.12; 455/575.1, 575.4; 16/327, 352, 16/362; 361/679.02, 679.3
See application file for complete search history.

(56) References Cited

U.S. PATENT DOCUMENTS

| | | |
|---|---|---|
| 2005/0113154 A1 | 5/2005 | Park et al. |
| 2006/0073858 A1 | 4/2006 | Nagashima |

FOREIGN PATENT DOCUMENTS

| | | |
|---|---|---|
| CN | 1617548 A | 5/2005 |
| CN | 1756469 A | 4/2006 |
| EP | 1530345 A1 | 5/2005 |
| EP | 1648145 A1 | 4/2006 |
| KR | 20-0365393 Y1 | 10/2004 |
| KR | 10-2005-118006 A | 12/2005 |
| KR | 10-2006-29496 A | 4/2006 |
| KR | 10-2006-49059 A | 5/2006 |
| KR | 20-417355 B1 | 5/2006 |
| KR | 10-2006-0083493 A | 7/2006 |
| KR | 20-429779 Y1 | 10/2006 |
| KR | 10-741492 B1 | 7/2007 |
| WO | 2005/091515 A | 9/2005 |
| WO | 2005091515 A1 | 9/2005 |

*Primary Examiner* — Tuan Nguyen (74) *Attorney, Agent, or Firm* — Jefferson IP Law, LLP (57) ABSTRACT

A spring employed in a semi-automatic sliding device of a sliding-type portable communication terminal is provided. The spring includes a first spring including a first coil spring having a first end and a first other end connected to the first end by means of a first link spring and arranged at a center of the first coil spring in the form of being wound at least one time, a second spring including a second coil spring having a second end and a second other end connected to the second end by means of the first link spring and arranged at a center of the second coil spring in the form of being wound at least one time and a connector for integrally fixing the first and second coil springs to the connector. The spring assists in the opening and closing of the portable terminal, allows the portable terminal to be made thinner and is simple to manufacture based on having few parts.

2 Claims, 8 Drawing Sheets

SPRING, SEMI-AUTOMATIC SLIDING DEVICE USING THE SAME AND SLIDING-TYPE PORTABLE COMMUNICATION TERMINAL

PRIORITY

This application claims the benefit under 35 U.S.C. §119(a) of a Korean patent application filed in the Korean Industrial Property Office on Oct. 31, 2006 and assigned Serial No. 2006-106387, the entire disclosure of which is hereby incorporated by reference.

BACKGROUND OF THE INVENTION

1. Field of the Invention

The present invention relates to a portable communication terminal such as a Digital Multimedia Broadcasting (DMB) phone, a game phone, a chatting phone, a camera phone, an MP3 phone, a cellular phone, a Personal Communications Service (PCS), a Personal Digital Assistant (PDA), a Hand Held Phone (HHP), and the like. More particularly, the present invention relates to a spring adapted for a sliding-type portable terminal and a semi-automatic sliding device using the same.

2. Description of the Related Art

Portable communication terminals include electronic devices that a user can carry on their person and use for wireless communication with another user. There are many types of wireless communication functions a portable communication terminal can perform. For example, a portable terminal can perform a voice communication function, a messaging function, a file sending function, an image communication function, a camera function, and others. Additionally, portable communication terminals can also play the role of a personal secretary that manages telephone numbers and personal schedules, etc.

In consideration of its portability, design of such a portable terminal has tended toward compactness, slimness and lightness. Design of portable terminals has also tended toward providing multimedia capabilities to allow the user to pursue a wider variety of functions, such as viewing entertainment contents, as an important function of the portable communication terminal. In the future, it is expected that portable communication terminals will tend to be complicated devices having multi-functions including image communication, games, Internet access, a camera, as well as simple voice communication.

Conventional portable terminals may be classified into various types according to their portability or convenience of use. Two such classifications, relating to a portable terminal's physical arrangement, are bar-type portable terminals and folder-type portable terminals. The bar-type portable communication terminal has a single housing shaped like a bar, on which an input/output unit, an antenna unit, a transmitter/receiver, etc. are mounted. The folder-type portable terminal has a folder connected to a bar-type single housing by means of a hinge device in such a manner that the folder can be rotated to fold on or unfold from the housing.

Further, portable communication terminals may be classified into a swing-type communication terminal or a sliding-type communication terminal according to the manner in which the terminal is opened and closed. In the swing-type communication terminal, two housings are coupled to each other in a manner that one housing swings to open or close the other while the housings are facing each other. In the sliding-type communication terminal, two housings are coupled to each other in a manner that one housing slides to open or close the other.

For example, the sliding-type portable communication terminal has a structure in that a body housing is coupled to a sliding housing by means of a sliding device while the housings face each other.

A sliding device adapted for a conventional sliding-type portable communication terminal is disclosed in detail in Japanese Patent Application No. 2003-393949, the entire disclosure of which is hereby incorporated by reference.

The sliding device disclosed in the Japanese Patent Application No. 2003-393949 has difficulty in that it cannot be made as thin as desired. Accordingly, there is a problem in that it is difficult to manufacture a slim sliding-type portable communication terminal.

Another sliding device adapted to a conventional sliding-type portable communication terminal is disclosed in detail in Korean Patent Application No. 2005-19808, the entire disclosure of which is hereby incorporated by reference.

However, the sliding device disclosed in the Korean Patent Application No. 2005-19808 also has difficulty in being made thin, and it also has a disadvantage of requiring many parts and thus a greater number of assembling steps.

SUMMARY OF THE INVENTION

Accordingly, the present invention has been made to address the above-mentioned problems and/or disadvantages and as aspect of the present invention is to provide a spring which is advantageous for slimness and lightness of a portable terminal, a semi-automatic sliding device using the spring, and a sliding-type portable communication terminal.

In accordance with an aspect of the present invention, a spring, a semi-automatic sliding device using the spring, and a sliding-type portable communication terminal are provided. The spring, the semi-automatic sliding device using the spring, and the sliding-type portable communication terminal include coil springs that are arranged in parallel and a curved connector that is disposed between the coil springs while protruding toward the coil springs. With this arrangement, the amount of variation of the coil springs is maximized.

In accordance with a further aspect of the present invention, a spring, a semi-automatic sliding device using the spring, and a sliding-type portable communication terminal are provided. In the spring, the semi-automatic sliding device using the spring, and the sliding-type portable communication terminal, a distance between a first coil spring and a fixed end and a distance between a second coil spring and a movable end become short, thereby making it possible to miniaturize the spring, reduce movement space, and minimize upward and downward movements of a sliding housing when the sliding housing moves longitudinally.

In accordance with another aspect of the present invention, a spring, a semi-automatic sliding device using the spring, and a sliding-type portable communication terminal are provided. The spring, semi-automatic sliding device using the spring, and sliding-type portable communication terminal have a simple structure to thereby reduce manufacturing costs based on a reduction of the number of manufacturing processes.

In accordance with yet a further aspect of the present invention, a sliding-type portable communication terminal is provided. In the sliding-type portable communication terminal, a spring and a flexible circuit are arranged at independent positions without interfering with each other, thereby preventing mutual interference, increasing the lifetime of a flexible circuit, reducing degradation of yield by improving the assembling capabilities, and achieving lightness of the portable terminal.

In accordance with an aspect of the present invention, a spring employed in a semi-automatic sliding device of a sliding-type portable communication terminal is provided. The spring comprises a first coil spring having a first end and a first other end connected to the first end by a first link spring wherein the first other end is arranged at a center of the first coil spring, a second coil spring having a second end and a second other end connected to the second end by a second link spring wherein the second other end is arranged at a center of the second coil spring and a connector, wherein the first and second coil springs are fixed to the connector.

In accordance with another aspect of the present invention, a semi-automatic sliding device of a sliding-type portable communication terminal including a body housing and a sliding housing, which can open and close the sliding housing on the body housing is provided. The semi-automatic sliding device comprises an upper surface of the body housing, a bottom surface of the sliding housing and a spring including a first spring, a second spring, and a connector, the first spring including a fixed end rotatively fixed to the upper surface of the body housing, and a first coil spring connected to the fixed end, the second spring including a movable end rotatively fixed to the bottom surface of the sliding housing and a second coil spring connected to the movable end, and a connector for integrating the first and second coil springs and providing a semi-automatic driving force to the sliding housing.

In accordance with still another aspect of the present invention, a sliding-type portable communication terminal is provided. The sliding type portable terminal comprises a body housing, a sliding housing, a spring disposed between an upper surface of the body housing and a bottom surface of the sliding housing for opening and closing the sliding housing and an opening formed in the upper surface of the body housing and spaced apart from a spring movement space so as to avoid interference with movement of the spring.

In accordance with still another aspect of the present invention, a spring for use in a semi-automatic sliding device of a sliding-type portable communication terminal is provided. The spring comprises a first end, a first coil spring connected to the first end, a second coil spring connected to the first coil spring and facing the first coil spring, a curved connector disposed between the first and second coil springs and protruding toward the first and second coil springs and a second end connected to the second coil spring.

In accordance with still another aspect of the present invention, a semi-automatic sliding device of a sliding-type portable communication terminal including a body housing and a sliding housing, which can open and close the sliding housing on the body housing, is provided. The semi-automatic sliding device comprises a fixed end rotatively coupled to an upper surface of a body housing, a first coil spring connected to the fixed end, a second coil spring connected to the first coil spring and facing the first coil spring in parallel, a movable end rotatively coupled to the bottom surface of the sliding housing and connected to the second coil spring and a spring including a curved connector disposed between the first and second coil springs and protruding toward the first and second coil springs, for applying semi-automatic driving force to the sliding housing.

BRIEF DESCRIPTION OF THE DRAWINGS

The above and other aspects, features and advantages of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In the following description of the present invention, a detailed description of known functions and configurations incorporated herein will be omitted for clarity and conciseness.

Figure 1:
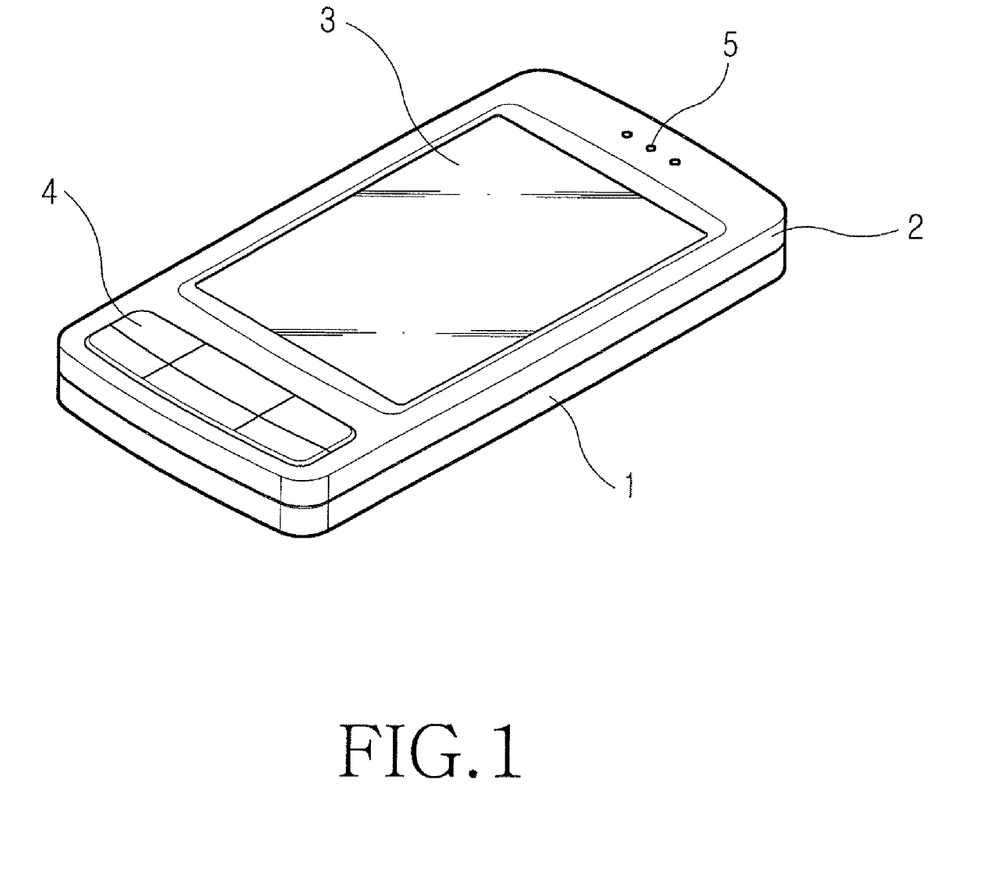
FIG. 1 is a perspective view illustrating a sliding-type portable communication terminal employing a semi-automatic sliding device according to an exemplary embodiment of the present invention.
Figures 2, 3:
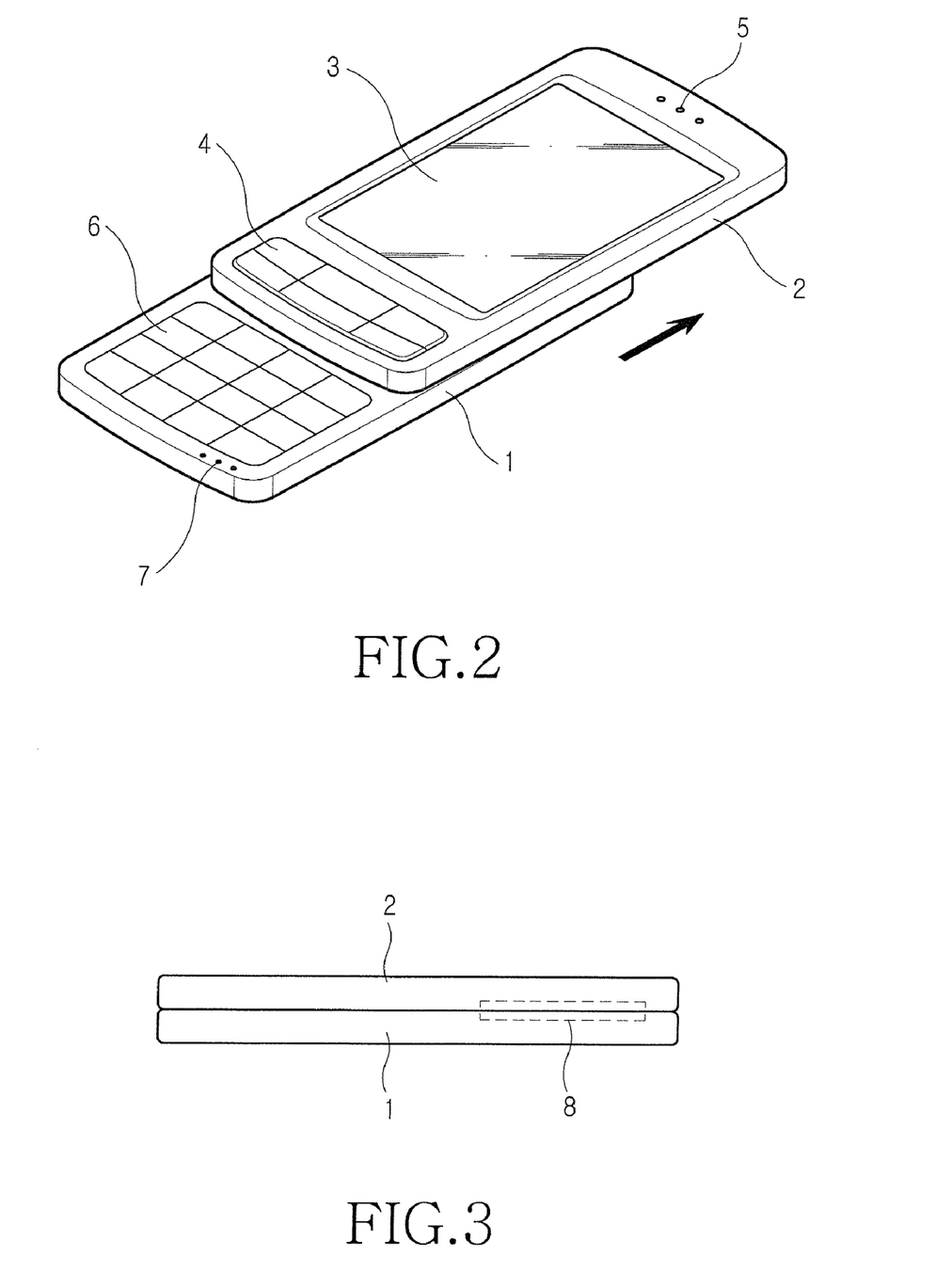
FIG. 2 is a perspective view illustrating the exemplary sliding-type portable communication terminal of FIG. 1, in which a sliding housing is open.
FIG. 3 is a side view illustrating the exemplary sliding-type portable communication terminal of FIG. 1 employing the semi-automatic sliding device according an exemplary embodiment of to the present invention.

Referring to FIGS. 1 to 3, the configuration of an exemplary sliding-type portable communication terminal will be described. An exemplary sliding-type portable communication terminal of the present invention includes a body housing 1, a sliding housing 2, and a semi-automatic sliding device 8. The semi-automatic sliding device 8 provides for coupling of the sliding housing 2 to the body housing 1 so that the sliding housing 2 can slide relative to the body housing 1. The body housing 1 includes a first keypad 6 including a plurality of keys and a microphone device 7, which are arranged thereon. The sliding housing 2 includes a speaker unit 5, a display unit 3, and a second keypad 4 having a plurality of keys. The first keypad 6 is exposed and covered by the sliding of housing 2.

By its structure as well as its mounting configuration within the sliding-type portable terminal, the semi-automatic sliding device 8 is able to apply force to the sliding housing 2 to assist in closing and opening the sliding housing 2 depending on the relative positions of the sliding housing 2 and the body housing 1. For example, as shown in FIG. 1, a sliding type portable terminal may begin in a closed position. As a user opens the portable terminal by sliding the sliding housing 2 relative to the body housing 1, the semi-automatic sliding device 8 will apply a force to the sliding housing 2 to assist in opening the sliding housing 2 once the sliding housing slides open on the body housing by a distance longer than a first distance. From an open position as shown in FIG. 2, a user may close the portable terminal by sliding the sliding housing 2 relative to the body housing 1. When the sliding housing reaches a distance shorter than the first distance, the semi-automatic sliding device 8 will apply force to the sliding housing to assist in closing the sliding housing 2. Again, FIG. 1 shows the closed sliding housing 2 on the body housing 1, and FIG. 2 shows the opened sliding device 2 on the body housing 1.

Hereinafter, an exemplary configuration of a semi-automatic sliding device adapted to a sliding-type portable terminal and a spring employed in the sliding device will be described.

Figure 4:
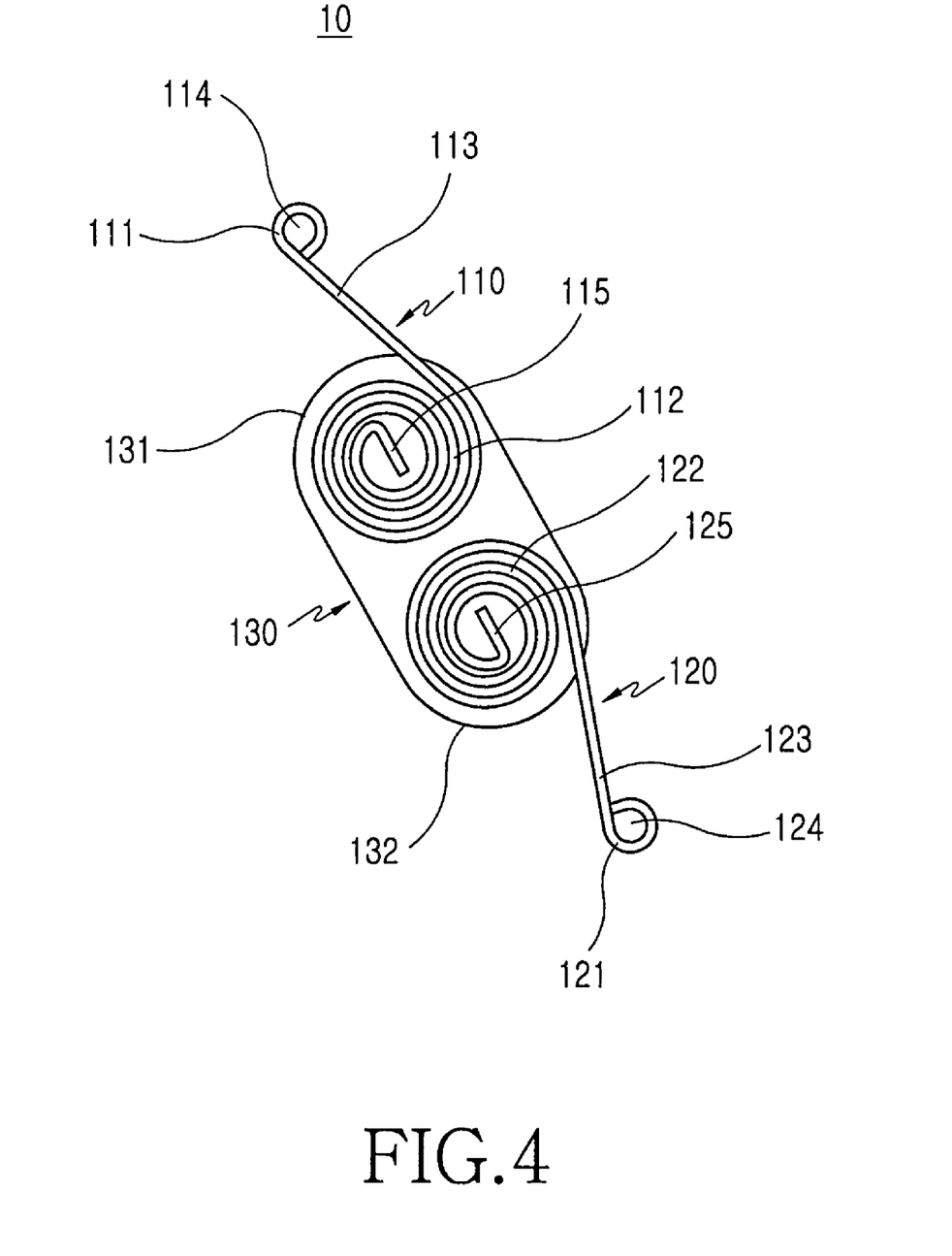
FIG. 4 is a front view illustrating a spring according to an exemplary embodiment of the present invention.

The structure of a spring 10 adapted to the semi-automatic sliding device according to a first exemplary embodiment of the present invention will be described with reference to FIG. 4. As illustrated in FIG. 4, the spring 10 according to a first exemplary embodiment of the present invention includes first and second springs 110 and 120, and a connector 130 for integrally connecting the first and second springs 110 and 120. Further, the first and second springs 110 and 120 have substantially identical shapes and are symmetrically mounted by means of the connector 130 to operate symmetrically.

The first spring 110 includes a first end 111 and a first coil spring 112 connected to the first end 111 by a first link spring 113. The first coil spring 112 is wound at least one time and has a first other end 115 disposed at a center portion. The first end 111 has an opening 114 formed to couple to a rivet or other connector, as described below. Again, the first coil spring 112 is wound at least one time and in an exemplary embodiment is wound three times. Of course, the coil spring 112 may be wound as many times as is appropriate for its application.

The second spring 120 includes a second end 121 and a second coil spring 122 connected to the second end 121 by a second link spring 123. The second coil spring 121 is wound at least one time and has a second other end 125 disposed at a center portion. The second end 121 has an opening 124 formed to couple to a rivet or other connector, as described below. Again, the second coil spring 122 is wound at least one time. In an exemplary embodiment, the coil spring is wound three times but may be wound a fewer or greater number of times as desired.

The first coil spring 112 is spirally wound so that the diameter thereof gradually decreases toward the center portion thereof, and has wound portions coaxial with one another.

The first coil spring 112 has the first end 111 and the first other end 115 with substantially identical thickness, making it possible to have an advantage in slimming the spring. The second coil spring 122 is spirally wound so that the diameter thereof gradually decreases toward the center portion thereof, and has wound portions coaxial with one another. The second coil spring 122 has the second end 121 and the second other end 125 with substantially identical thickness, making it possible to have an advantage in slimming the spring.

The first and second coil springs 112 and 122 provide elasticity in a direction away from each other around the connector 130.

In an exemplary embodiment, the connector 130 has a linearly long shape, which is a shape that is longer than it is wide. An exemplary connector also has two ends 131 and 132 with a semi-circular shape. In another exemplary embodiment, the first and second coil springs 112 and 122 are arranged in parallel while located near ends 131 and 132 of the connector 130 respectively.

Hereinafter, the configuration of a semi-sliding device adapted to the spring according to a first exemplary embodiment of the present invention will be described with reference to FIGS. 5 and 6.

Figure 5:
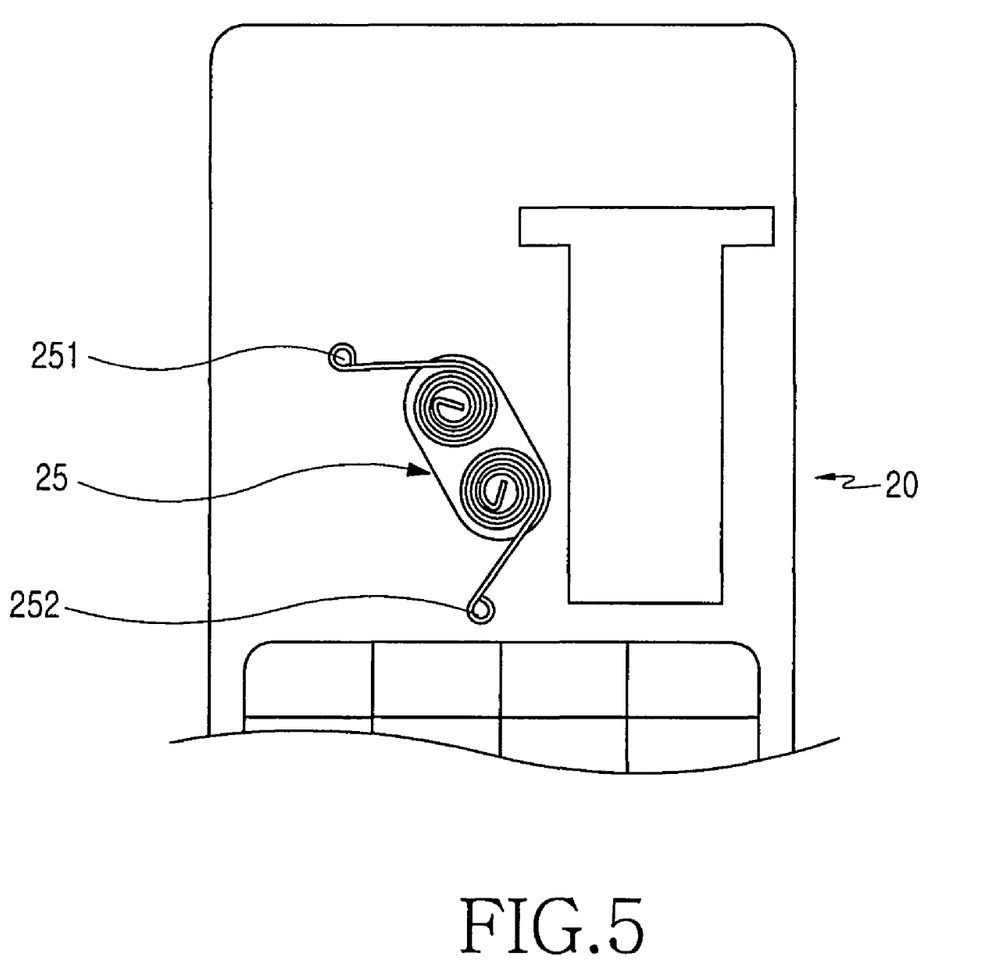
FIG. 5 is a front view illustrating a semi-automatic sliding device employing the spring of FIG. 4 according to an exemplary embodiment of the present invention, in which a sliding housing is closed.
Figure 6:
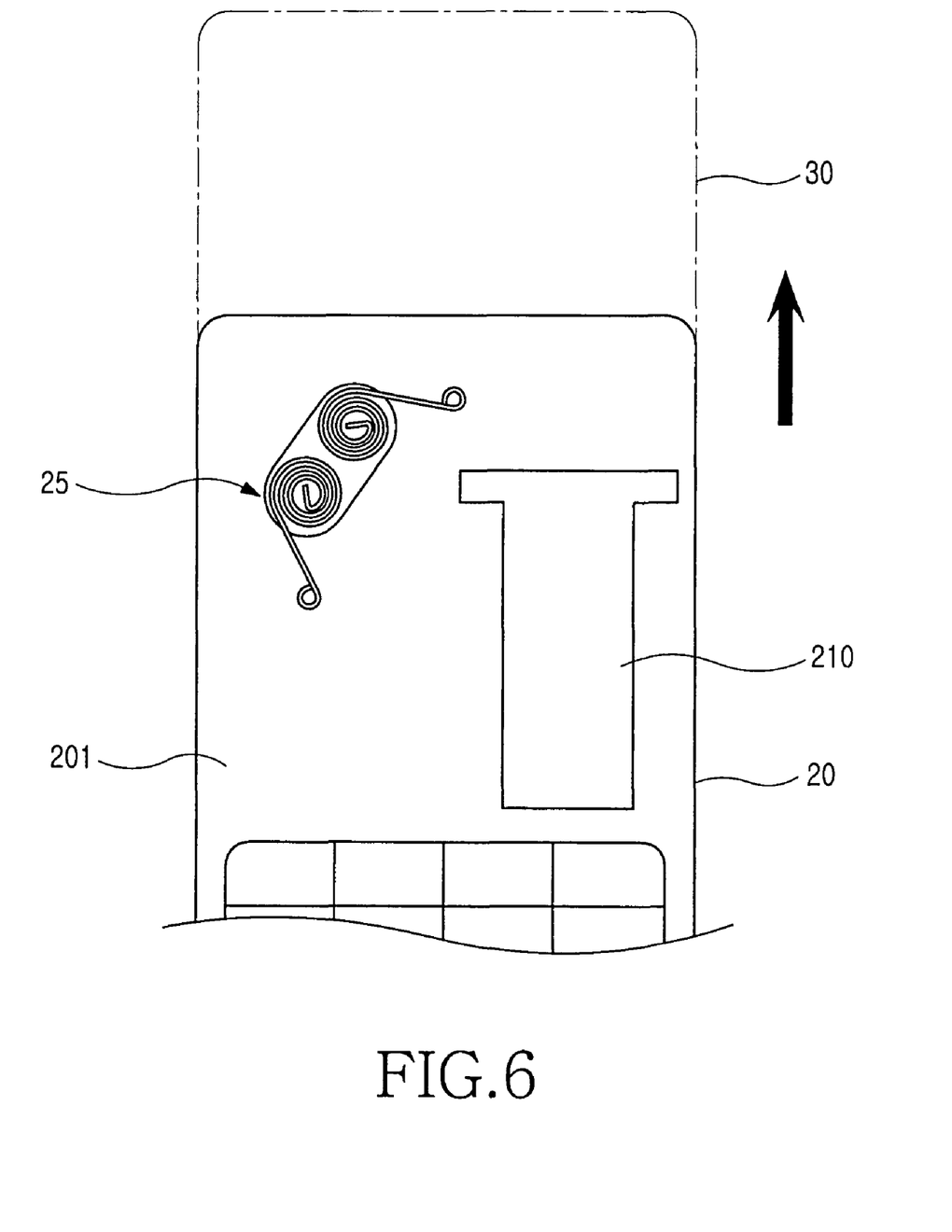
FIG. 6 is a front view illustrating the semi-automatic sliding device of FIG. 5 employing the spring according to an exemplary embodiment of the present invention, in which the sliding housing is open.

Referring to FIGS. 5 and 6, the semi-automatic sliding device according to an exemplary embodiment of the present invention includes a body housing 20, a sliding housing 30, and a spring 25. The spring 25 has one end 251 rotatively fixed to an upper surface 201 of the body housing 20 and another end 252 rotatively fixed to a bottom surface of the sliding housing 30, so as to supply force for semi-automatic movement of the sliding housing 30. Also, the semi-automatic sliding device according to an exemplary embodiment of the present invention has an opening 210 formed in the body housing 20, which is apart from a movement space for the spring 25.

The one end 251 is rotatively fixed to a position on the upper surface of the body housing 20, and the other end 252 is rotatively fixed to a position on the bottom surface of the sliding housing 30. By means of its coupling to the upper surface of the body housing 20, the one end 251 is a rotatively fixed end relative to the body housing 20. Furthermore, by means of its coupling to the bottom surface of the sliding housing 30, the other end 252 is a rotatively movable end relative to the body housing 20. That is, both the one end 251 and the other end 252 are capable of rotating about their respective connection points. However, the one end 251 is fixed to the upper surface of the body housing and the other end 252 is fixed to the bottom surface of the sliding housing. Because the sliding housing 30 slides relative to the body housing 20, the other end 252 rotates and is moveable relative the first end 251 which is fixed to the body housing 20. By the movement of the other end 252 relative to the first end 251, the semi-automatic sliding device may be compressed, relaxed or in tension and apply a force accordingly.

The opening 210 is a pathway through which a well known flexible circuit (not shown) may extend so as to electrically connect the sliding housing 30 to the body housing 20. The spring 25 is disposed in a first region on the upper surface 201 of the body housing 20, and the opening 210 is formed in a second region on the upper surface 201 of the body housing 20. When the sliding housing 30 moves, the flexible circuit is always present in the opening 210. By means of its arrangement in the first region, it is possible to prevent the spring 25 from interfering with the flexible circuit formed to extend through the opening 210 which is located in the second region.

Again, the one end 251 is a fixed end, and the other end 252 is a movable end, both relative to the body housing 20. Accordingly, as the sliding housing 30 is slid from a closed position as shown in FIG. 5 toward an open position as shown in FIG. 6, a distance between the one end 251 and the other end 252 will shorten until the sliding housing 30 reaches a first distance. By shortening the distance between the ends 251 and 252, the spring 25 is placed in compression until the housing reaches the first distance. As the sliding housing passes the first distance and continues to open, the now compressed spring 25 will apply a force to assist in opening the sliding housing 30. Conversely, as the sliding housing is slid from an open position as shown in FIG. 6 toward a closed position as shown in FIG. 5, a distance between the ends 251 and 252 will again shorten, and the spring 25 will compress until the sliding housing reaches the first distance. As the sliding housing continues to close to distances shorter than the first distance, the now compressed spring 25 will apply a force to assist in closing the sliding housing 30.

Since the configuration of the spring 25 was earlier described in detail with reference to FIG. 4, a detailed description of the spring 25 will be omitted.

Hereinafter, a configuration of the spring adapted to a semi-automatic sliding device according to a second exemplary embodiment of the present invention will be described with reference to FIG. 7.

Figure 7:
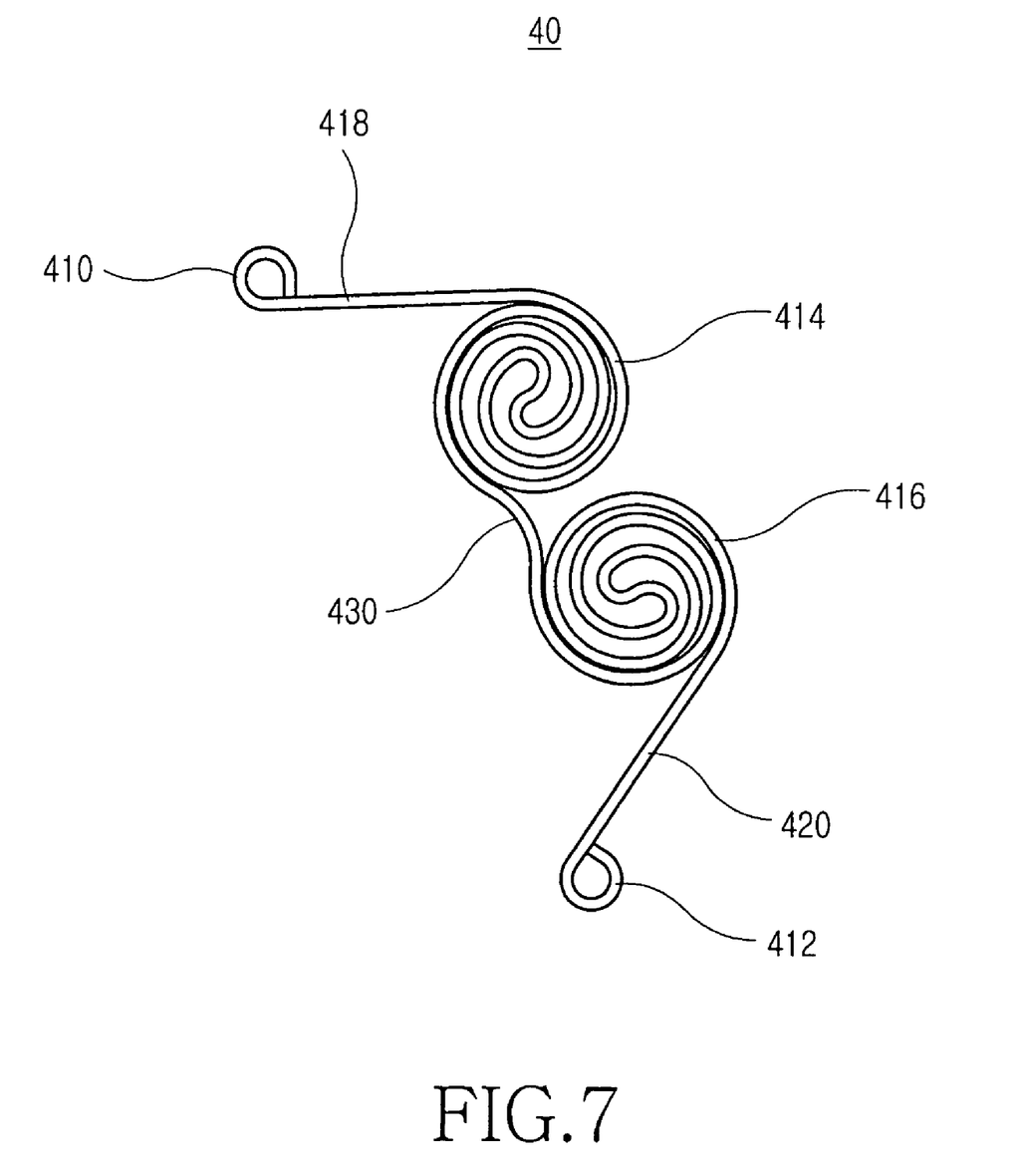
FIG. 7 is a front view illustrating a spring according to an exemplary embodiment of the present invention.

As shown in FIG. 7, a spring 40 according to a second exemplary embodiment of the present invention includes one end 410, a first coil spring 414 connected to the end 410 by means of a first link spring 418 and wound at least one time, a second coil spring 416, connected to the first coil spring 414, wound at least one time and facing the first coil spring 414, a connector 430 provided between the first and second coil springs 414 an 416 and protruding toward the first and second coil springs 414 and 416 to maximize elasticity, and another end 412 connected to the second coil spring 414 by means of a second link spring 420. The one end 410 and the other end 412 are bent through which rivets or other connectors (not shown) may be inserted. In an exemplary embodiment as shown in FIG. 7, an outline of the spring 40 has a 'W' shape.

The first coil spring 414 is wound in parallel and has the one end 410 and the other end 412 with substantially the same thickness. The second coil spring 416 is also wound in parallel and has the one end 410 and the other end 412 with the same thickness. In addition, the one end 410, the other end 412, the first and second link springs 418 and 420, and the first and second coil springs 414 and 416 are integrally formed, wound and bent several times. That is, the one end 410 and the other end 412 are connected to each other without use of a separate connector.

In an exemplary embodiment, the first coil spring 414 is connected to the one end 410 by means of the first link spring 418. Then, the first coil spring 414 is wound toward the center thereof so that the diameter thereof gradually decreases, is bent at the center thereof and wound in a reverse direction to the circumference thereof so that the diameter thereof gradually increases. Further, the second coil spring 416 is connected to the first coil spring 414 by means of the connector 430. The second coil spring 416 is wound toward the center thereof so that the diameter thereof gradually decreases, is bent at the center thereof and wound in a reverse direction to the circumference thereof so that the diameter thereof gradually increases. The second coil spring 416 is linearly connected to the other end 412.

Figure 8:
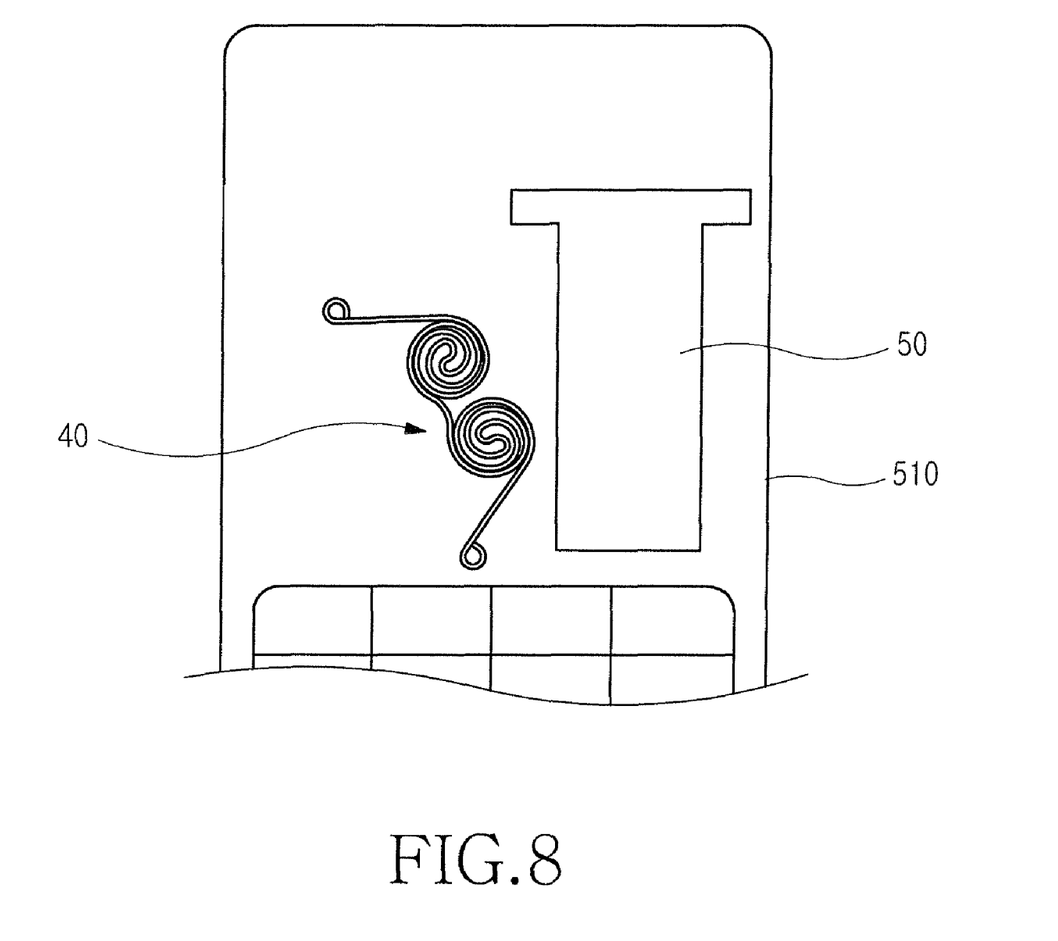
FIG. 8 is a front view illustrating a semi-automatic sliding device employing the spring of FIG. 7 according to an exemplary embodiment of the present invention, in which a sliding housing is closed.
Figure 9:
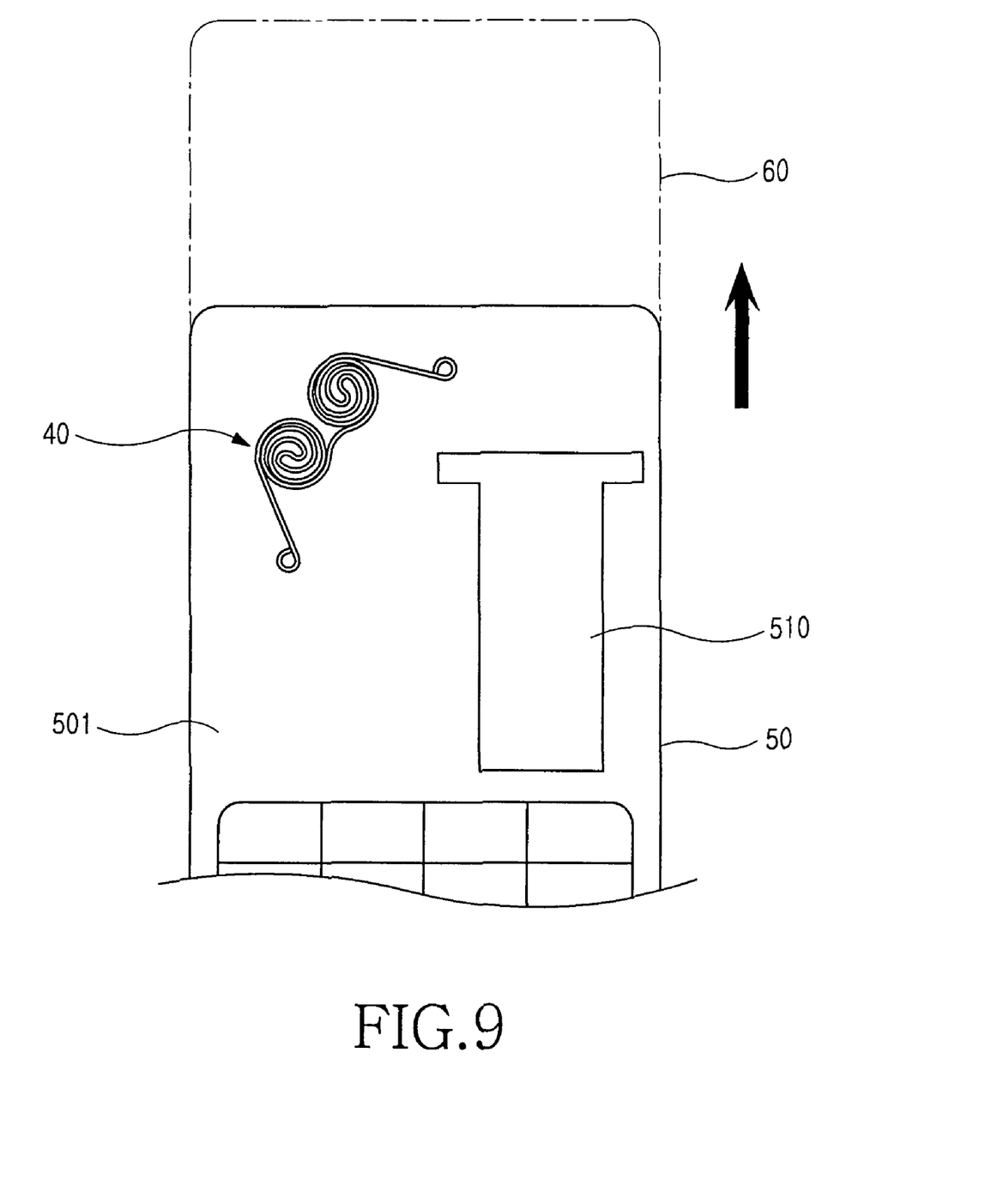
FIG. 9 is a front view illustrating the semi-automatic sliding device of FIG. 8 employing a spring according to an exemplary embodiment of the present invention, in which the sliding housing is open.

An exemplary configuration of a semi-automatic sliding device employing the spring will be described with reference to FIGS. 8 and 9. As shown in FIGS. 8 and 9, the semi-automatic sliding device according to an exemplary embodiment of the present invention operates much as the semi-automatic sliding device of FIGS. 5 and 6. That is, the semi-automatic sliding device supplies force to close the sliding housing 60 when the sliding housing 60 slides on the body housing 50 by a distance shorter than a first distance, while supplying force to open the sliding housing 60 when the sliding housing 60 slides on the body housing 50 by a distance longer than the first distance. The semi-automatic sliding device includes a spring 40 having a fixed end 410 rotatively fixed to the upper surface of the body housing 50, and a movable end 412 rotatively coupled to the bottom surface of the sliding housing 60. Since the configuration of the spring 40 is described with reference to FIG. 7, the description of the spring will be omitted.

As shown in FIGS. 8 and 9, a movement space for the spring 40 is independently formed at a region which is spaced apart from the opening 510 through which a flexible circuit (not shown) extends. Specifically, when the sliding housing 60 is opened and closed, the opening 510 prevents in advance interference caused by movement of the spring 40. In addition, the sliding housing 60 linearly moves by means of a guide rail (not shown).

As described above, exemplary embodiments of the present invention are advantageous for slimming a portable communication terminal. Further, according to exemplary embodiments of the present invention, since two coil springs are arranged in parallel, and a curved connector is provided between the coil springs, it is possible to maximize the flexibility of the spring. The distance between the first coil spring and the fixed end, and the second coil spring and the movable end becomes short, thereby making it possible to miniaturize the spring. Further, when the sliding housing slides, it is possible to reduce the upward and downward movements of the sliding housing. In addition, exemplary embodiments of the present invention have simple structures which contribute to the reduction of manufacturing costs based on the reduced numbers of processes. Furthermore, according to exemplary embodiments of the present invention, the spring and the flexible circuit are disposed at independent positions without interfering with each other, thereby making it possible to increase the lifetime of the flexible circuit and to prevent the degradation of yield due to the improvement of the assembling capability.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A sliding-type portable communication terminal, comprising:
    a body housing including an upper surface;
    a sliding housing including a bottom surface;
    a spring coupled between the upper surface of the body housing and the bottom surface of the sliding housing for assisting in movement of the sliding housing; and
    an opening formed in the upper surface of the body housing at a location spaced apart from a movement space of the spring,
    wherein the spring comprises a first coil spring, a second coil spring, and a connector provided between the first coil spring and the second coil spring so that the first coil spring and the second coil spring operate symmetrically.

2. The sliding-type portable communication terminal as claimed in claim 1, further comprising a flexible circuit located in the opening wherein the spring is arranged in a first region on the upper surface of the body housing, and the opening is formed in a second region on the upper surface of the body housing so as to prevent the spring from interfering with the flexible circuit during movement of the sliding housing.

* * * * *